United States Patent
Singh

(10) Patent No.: US 9,874,496 B2
(45) Date of Patent: Jan. 23, 2018

(54) TIRE SUSPENSION FUSION SYSTEM FOR ESTIMATION OF TIRE DEFLECTION AND TIRE LOAD

(71) Applicant: The Goodyear Tire & Rubber Company, Akron, OH (US)

(72) Inventor: Kanwar Bharat Singh, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 860 days.

(21) Appl. No.: 13/795,761

(22) Filed: Mar. 12, 2013

(65) Prior Publication Data

US 2014/0260585 A1   Sep. 18, 2014

(51) Int. Cl.
*B60C 23/06* (2006.01)
*G01M 17/02* (2006.01)
*B60C 23/04* (2006.01)

(52) U.S. Cl.
CPC ......... *G01M 17/02* (2013.01); *B60C 23/0488* (2013.01); *B60C 23/064* (2013.01); *B60C 23/065* (2013.01)

(58) Field of Classification Search
CPC .................................................. B60C 23/064
See application file for complete search history.

(56) References Cited

U.S. PATENT DOCUMENTS

| | | | |
|---|---|---|---|
| 4,364,267 A * | 12/1982 | Love et al. | 73/146 |
| 7,546,764 B2 | 6/2009 | Morinaga et al. | 73/146 |
| 7,552,628 B2 | 6/2009 | Mancosu et al. | 73/146 |
| 2005/0097949 A1* | 5/2005 | Hillenmayer et al. | 73/146 |
| 2008/0103659 A1 | 5/2008 | Mancosu et al. | 701/41 |
| 2009/0055040 A1 | 2/2009 | Nagaya | 701/29 |
| 2010/0198527 A1* | 8/2010 | Gouriet et al. | 702/33 |
| 2011/0199201 A1 | 8/2011 | Brusarosco et al. | 340/438 |

FOREIGN PATENT DOCUMENTS

| | | | |
|---|---|---|---|
| EP | 2774784 | 9/2014 | ............. B60C 23/06 |
| WO | 2001/054363 | 5/2011 | ......... B60G 17/0165 |

OTHER PUBLICATIONS

European Search Report received by Applicant dated Oct. 24, 2014.

* cited by examiner

*Primary Examiner* — Peter Macchiarolo
*Assistant Examiner* — Herbert K Roberts
(74) *Attorney, Agent, or Firm* — Edward T. Kennedy

(57) ABSTRACT

A system and method estimating a vehicle tire load includes a tire static load estimator estimating a static tire load using a tire attached TPMS sensor; a Kalman filter based tire deflection estimator estimating tire vertical deflection; a load variation estimator estimating the instantaneous load variation by using the tire vertical deflection information; and an output tire load estimator calculating an output load estimation mathematically by fusing the static tire load with the instantaneous load variation information. The tire deflection estimator includes a chassis accelerometer measuring a chassis vertical acceleration; and a hub accelerometer measuring a wheel hub vertical acceleration of the tire. A linear filter model receives as inputs the chassis vertical acceleration and the wheel hub vertical acceleration.

17 Claims, 5 Drawing Sheets

TIRE SUSPENSION FUSION SYSTEM FOR ESTIMATION OF TIRE DEFLECTION AND TIRE LOAD

FIELD OF THE INVENTION

The invention relates generally to tire monitoring systems for collecting measured tire parameter data during vehicle operation and, more particularly, to a system and method for estimating vehicle tire deflection and load based upon analytic assessment of such measurements.

BACKGROUND OF THE INVENTION

Vehicle-mounted tires may be monitored by tire pressure monitoring systems (TPMS) which measure tire parameters such as pressure and temperature during vehicle operation. Data from TPMS tire-equipped systems is used to ascertain the status of a tire based on measured tire parameters and alert the driver of conditions, such as low tire pressure or leakage, which may require remedial maintenance. Sensors within each tire are either installed at a pre-cure stage of tire manufacture or in a post-cure assembly to the tire.

Other factors such as tire load are important considerations for vehicle operation and safety. It is accordingly further desirable to measure tire load in a sufficiently accurate manner in order to communicate such a load estimation to a vehicle operator and/or vehicle systems such as braking and control systems in conjunction with the measured tire parameters of pressure and temperature.

SUMMARY OF THE INVENTION

According to an aspect of the invention a system and method estimating a vehicle tire load includes a tire static load estimating means for estimating a static tire load; tire deflection estimating means for estimating a deflection-based tire load calculated from a measurement of a tire vertical deflection; load variation estimation means estimating the instantaneous tire load variation by using the tire vertical deflection information; output tire load estimation means for calculating substantially an output load estimation mathematically fusing the static tire load with the load variation.

In another aspect, the calculation of output load estimation from the deflection-based tire load and the load variation occurs substantially instantaneously.

Pursuant to a further aspect, the tire deflection estimating means includes a chassis accelerometer measuring a chassis vertical acceleration; and a hub accelerometer measuring a wheel hub vertical acceleration of the tire.

A linear filter model such as a Kalman Filter, in a further aspect, receives as inputs the chassis vertical acceleration and the wheel hub vertical acceleration.

DEFINITIONS

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"CAN bus" or "controller area network" is a vehicle bus standard designed to allow microcontrollers and devices to communicate with each other within a vehicle without a host computer. CAN bus is a message-based protocol, designed specifically for automotive applications.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Kalman Filter" is a set of mathematical equations that implement a predictor-corrector type estimator that is optimal in the sense that it minimizes the estimated error covariance—when some presumed conditions are met.

"Lateral" means an axial direction.

"Lateral edges" means a line tangent to the axially outermost tread contact patch or footprint as measured under normal load and tire inflation, the lines being parallel to the equatorial centerplane.

"Luenberger Observer" is a state observer or estimation model. A "state observer" is a system that provide an estimate of the internal state of a given real system, from measurements of the input and output of the real system. It is typically computer-implemented, and provides the basis of many practical applications.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Slip Angle" is the angle between a vehicle's direction of ravel and the direction in which the front wheels are pointing. Slip angle is a measurement of the deviation between the plane of tire rotation and the direction of travel of a tire.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1:
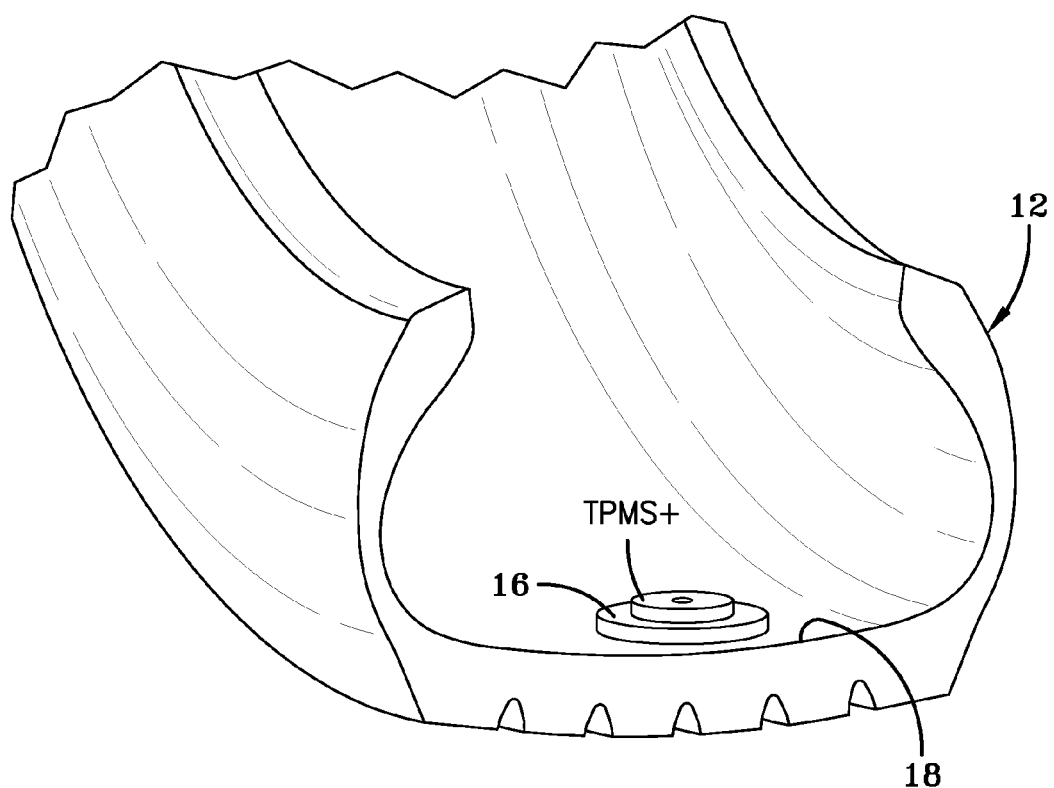
FIG. 1 is a perspective view of a cut away tire section showing placement of a tire pressure monitoring device attached to the tire inner liner.
Figure 2:
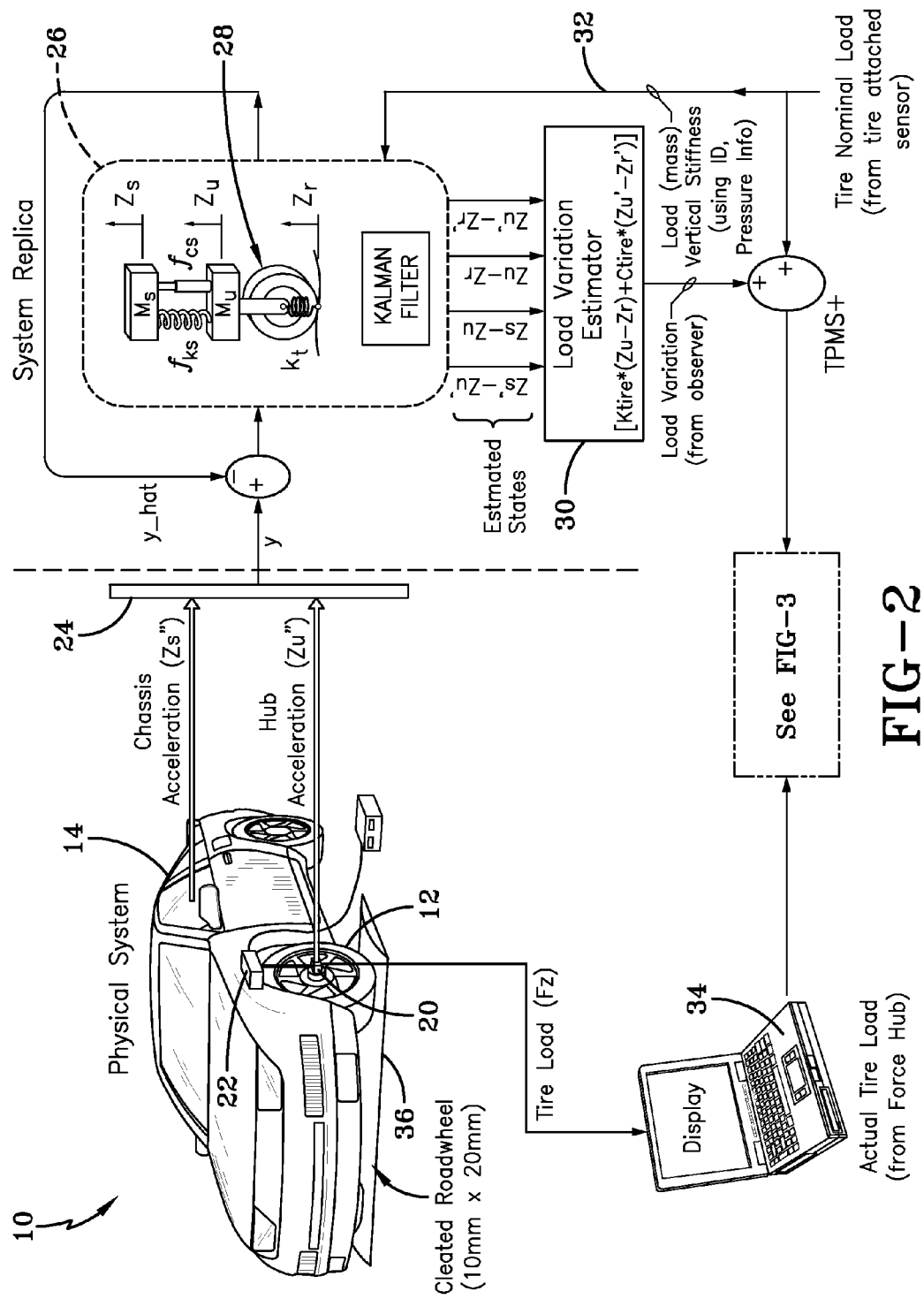
FIG. 2 is a block level schematic representation of a physical system coupled to the estimation system of generating the tire load estimation.
Figure 4:
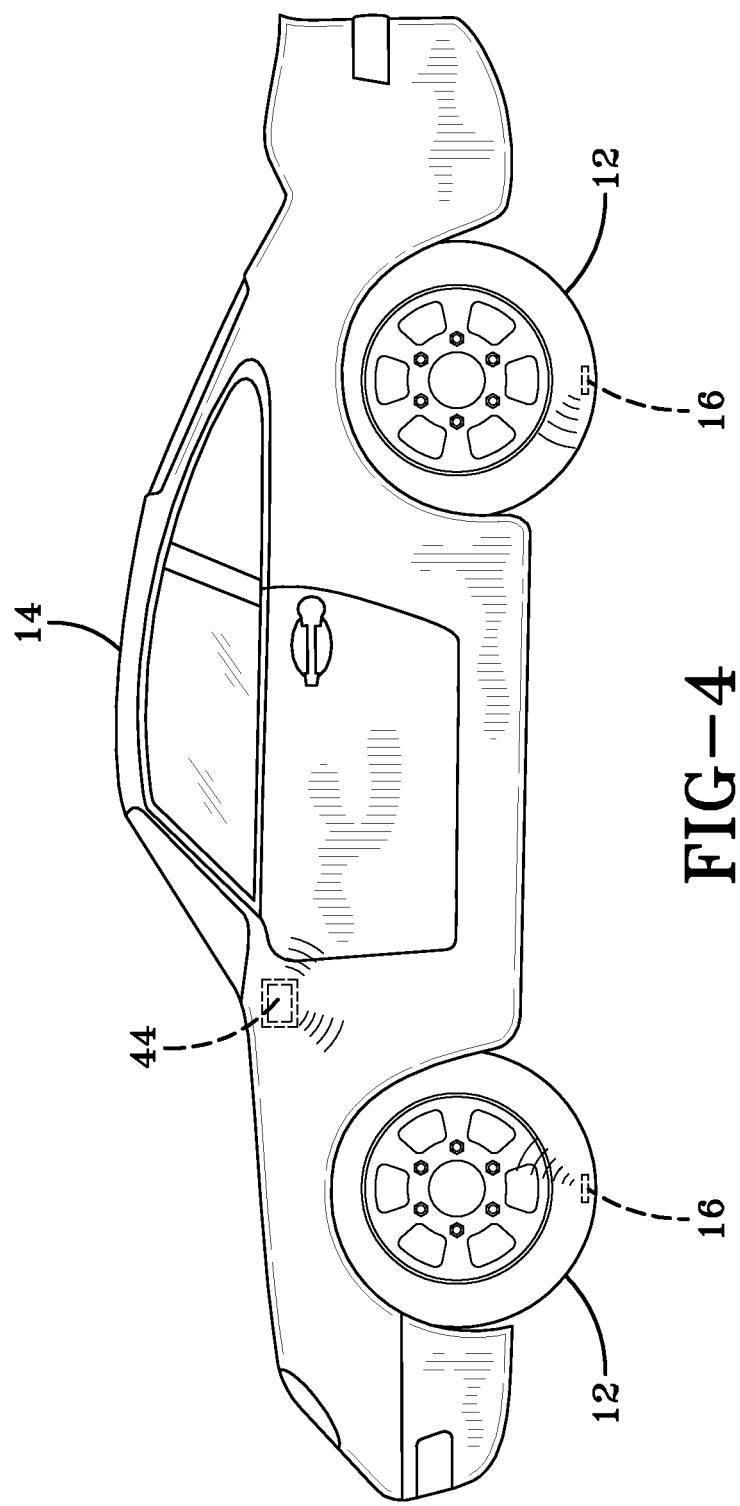
FIG. 4 is a vehicle diagram showing a tire pressure monitoring device attached to each tire and transmitting data to a vehicle-mounted load estimation module.

Referring first to FIGS. 1, 2, and 4, the subject system and method 10 for estimating an instantaneous tire load is shown schematically by FIG. 2. A tire 12 supports a vehicle 14. Each of the tires 12 is equipped with a tire pressure monitoring device (TPMS) 16 of commercially available configuration affixed to a tire component such as a tire inner liner 18 by suitable means such as adhesive. The TPMS device 16 is equipped with an air pressure measuring sensor for measuring air pressure within a tire cavity and a transmitter for transmitting the measured pressure data to a vehicle-based data processing receiver 44. CAN Bus 24 conveys sensor data from a hub accelerometer 20 mounted to the wheel hub and a chassis mounted chassis accelerometer 22. The sensor data from the accelerometers 20, 22 are conveyed to a data processing unit that includes an observer 26, such as but not limited to a Kalman filter, that functions utilizing Kalman-filtering techniques. The Kalman Linear Filter 26 estimates the vertical deflection of the tire 12 by applying estimation techniques based on the "quarter car model" 28 shown in FIG. 2 in which:

$Z_s$=chassis vertical deflection as measured by accelerometer 22;

$Z_u$=Hub vertical deflection as measured by accelerometer 20;

$Z_r$=Wheel vertical deflection
$K_{suspension}$=suspension stiffness
$C_{suspension}$=suspension dampening coefficient
$K_{tire}$=tire stiffness
$C_{tire}$=tire dampening coefficient
$M_s$=sprung mass
$M_u$=unsprung mass The standard notational convention for describing a State-space representation is given by:

$$x'=Ax+Bu\}  \quad \text{state equations}$$

$$y=Cx+Du\}  \quad \text{output equations}$$

where:
x(t) State vector
x'(t) Derivative of state vector
A State matrix
B Input matrix
u(t) Input vector
y(t) output vector
C output matrix
D Direct transmission matrix The equivalent state space representation of the "quarter car model" used in the Kalman filter has been specified below as $A=[((-C_{suspension}/M_s)-(C_{suspension}/M_u)) \quad ((-K_{suspension}/M_s)-(K_{suspension}/M_u)) \quad (K_{tire}/M_u)0;$
1 0 0 0;
0 0 0 1;
$C_{suspension}/M_u \ K_{suspension}/M_u-K_{tire}/M_u \ 0]$
$B=[0\ 0\ 0\ 0]$
$C=[-C_{suspension}/M_u-K_{suspension}/M_u \ 0\ 0;$
$C_{suspension}/M_u \ K_{tire}/M_u \ K_{tire}/M_u \ 0]$
$D=[0\ 0]$ Estimated states of the Kalman linear filter 28 are ($Z_s'-Z_u'$); ($Z_s-Z_u$); ($Z_u-Z_r$); and ($Z_u'-Z_r'$). The state estimations are input into a Load Variation Estimator 30 and utilized within the expression:

$$[Ktire*(Z_u-Z_r)+Ctire*(Z_u'-Z_r')] \qquad (1)$$

The Kalman Filter 26, in performing its state estimation, further utilizes a tire nominal static load 32 in conjunction with the tire stiffness information. The static load estimation is generated by tire attached sensors. The TPMS system produces tire identification and inflations data which is used to consult and extract tire stiffness $K_{tire}$ from a tire-specific database. The Load Variation from Load Variation Estimator 30 is calculated by use of Expression (1), fusing the tire deflection information with the tire load and stiffness information.

Figure 3:
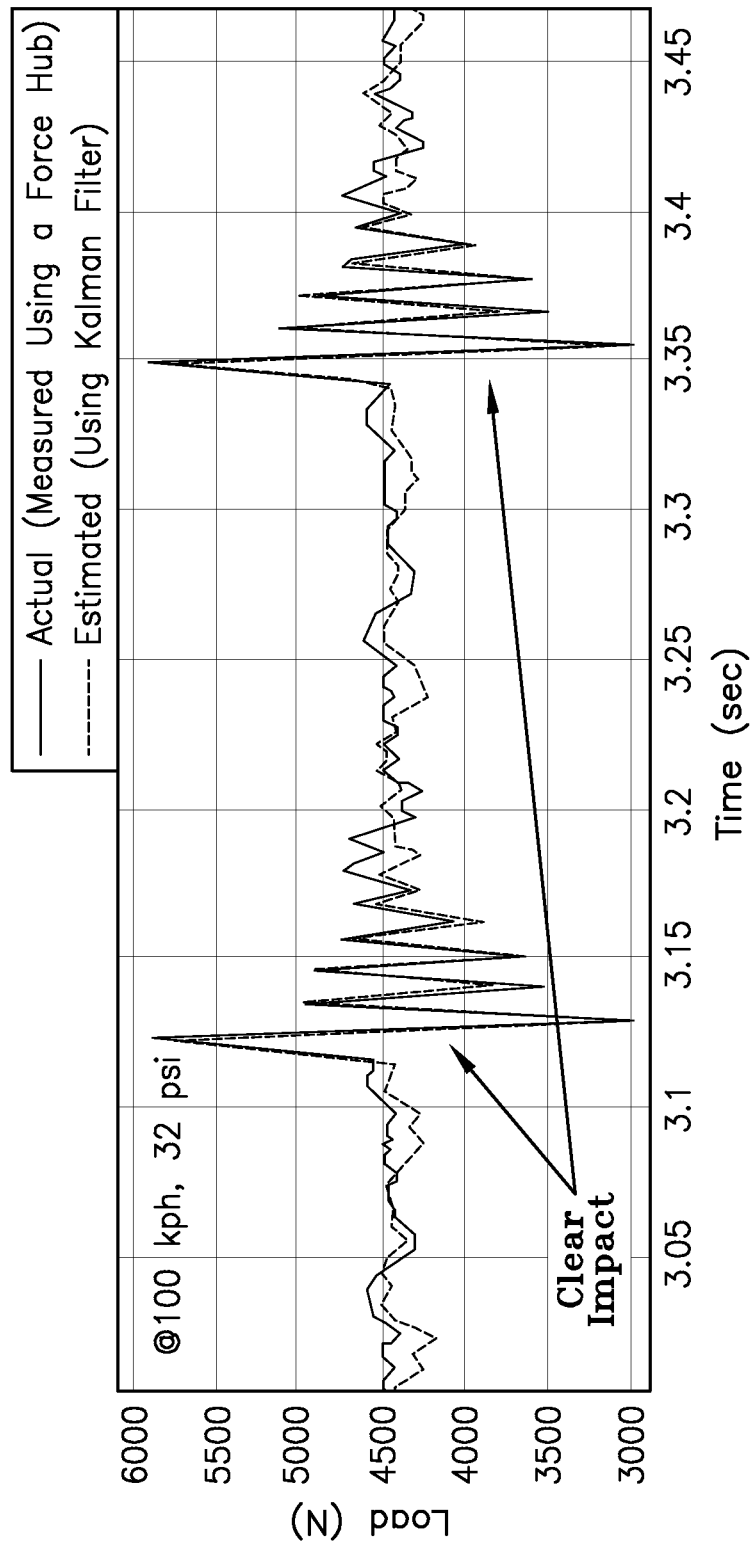
FIG. 3 is a graph of load vs. time for actual measured load and estimated load generated through use of the subject system and method.

In order to verify the accuracy of the instantaneous load estimation, actual loading on a tire 12 is measured in the FIG. 2 experimental physical system by a force hub and display 34. The estimated instantaneous load on tire 12 is compared against the actual loading on the tire and the comparison is indicated graphically by FIG. 3. The estimated load from FIG. 2 load variation estimator 30 is compared to the actual tire load Fz from the Force Hub. In FIG. 3, the load (N) over time is graphed at a vehicle speed of 100 kph, and a tire inflation of 32 psi. It will be seen from FIG. 3 that the actual loading (measured by the force hub) and the estimated instantaneous load estimation made by the system and method 10 of FIG. 2 compare favorably and achieve an estimation correlation of (R)=0.926.

Figure 5:
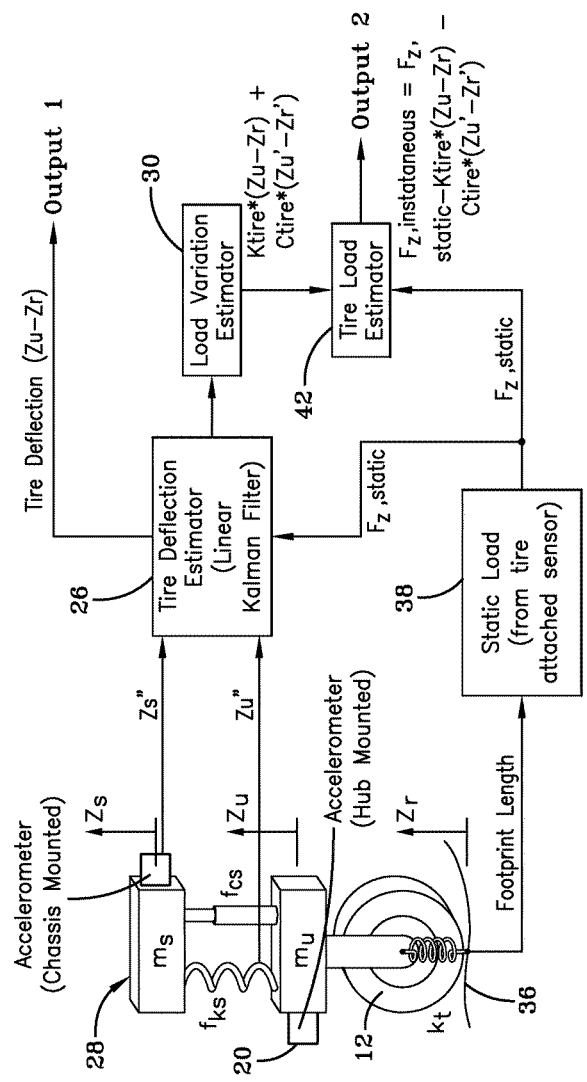
FIG. 5 is a block level diagram showing the estimation scheme employed using a vehicle quarter-scale dynamic model.

The "quarter car model" 28 estimation scheme is shown in schematic detail by FIG. 5. In the estimation, the Kalman Filter 26 analyzes suspension reaction of a quarter car model traversing a ground surface 36. Measuring the vertical deflection of the vehicle system to undulations present in the road surface 36, accelerometer 22 measures chassis vertical acceleration Zs; while accelerometer 20 measures wheel hub vertical acceleration Zu. The acceleration parameters Zs" and Zu" input into the tire deflection estimator 26 (Linear Kalman Filter). Tire defection is estimated by the Kalman Filter 26 and a first output, representing the tire deflection, is expressed by (Zu−Zr). The footprint length of a tire traversing over a road surface 36 is analyzed and measured by tire mounted sensors. The length of the footprint is proportionate to a static loading on the tire and by measuring the footprint length, an estimate of static loading can be made. The static load 38 from the tire attached sensor (measuring footprint length) is fed to a tire load estimator 42 which also receives the load variation estimation from equation (1) above. Using the statis load 38 information from tire attached sensors and the load variation estimated by the Kalman Filter 26m, an instantaneous load estimate $F_{z\ instanteous}$ is made by using equation (2) below.

$$F_{z,instantaneous}=F_{z,static}-K\text{tire}*(Z_u-Z_r)-C\text{tire}*(Z_u'-Z_r') \quad (2)$$

Static loading on the tire 12 may be estimated by conducting a tire deformation analysis such as that described in co-pending U.S. patent application Ser. No. 13/609,695, filed Sep. 11, 2012, entitled "TIRE SIDEWALL LOAD ESTIMATION SYSTEM AND METHOD", incorporated herein in its entirety by reference. The static load Fz static from the tire attached sensor 16 (FIG. 4) is then available for use by the Kalman Filter 26 as described previously. The physical system of FIG. 2 displays load estimation results that compare favorably with the FIG. 3 actual load force hub measurements.

As a result, the tire vertical deflection, reconstructed using the quarter car model, is sufficiently accurate for the purpose of providing an instantaneous load estimation. The chassis and hub mounted accelerometers used in physical system of FIG. 2 allows for a successful implementation of the observer using Kalman filtering techniques, and results in an acceptable correlation between actual and estimated load values.

From the foregoing, it will be appreciated that the subject system and method uses Kalman filtering techniques to estimate the vertical deflection of a tire by starting with the measures of the vehicle suspension dynamics. The observer is based on a "quarter car model" as replicated in FIGS. 2 and 5. In addition, it is shown that the subject methodology may calculate an instantaneous load on a tire using instantaneous tire deflection information. Tire attached TPMS data (inflation pressure and tire identification) is used to determine tire stiffness by application of a tire-specific database. The tire stiffness is used with a sensor load (static) estimate obtained from tire based sensors (as in U.S. patent application Ser. No. 13/609,695, filed Sep. 11, 2012) and fused with the instantaneous load variation estimate 30 (using the tire defection information) to yield an instantaneous load estimation.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire load estimation system for a vehicle comprising:
at least one tire mounted to a wheel hub and supporting a vehicle chassis;
at least one tire static load sensor mounted to the at least one tire for detecting a measured static tire load;
a tire static load estimator for calculating an estimated tire static load on the at least one tire based on the measured static tire load;
at least one vehicle chassis-mounted sensor for measuring a vehicle chassis vertical deflection;
a tire deflection estimator for determining a tire vertical deflection estimate from the estimated tire static load and the vehicle chassis vertical deflection;
a load variation estimator for determining a load variation estimate from the tire vertical deflection estimate; and
a tire load estimator operative to determine a substantially instantaneous load on the at least one tire based on the estimated tire static load and the load variation estimate.

2. The tire load estimation system of claim 1, wherein further comprising:
a tire inflation pressure measuring sensor mounted to the at least one tire for measuring tire inflation pressure within a tire cavity of the at least one tire;
a tire-specific stiffness database adjusted for tire inflation pressure for identifying a tire-specific stiffness for the at least one tire at the measured tire air pressure;
a tire vertical stiffness estimator for estimating a tire vertical stiffness from the tire inflation pressure and the tire-specific stiffness for the at least one tire; and
wherein the tire deflection estimator operably uses as an input the tire-specific vertical stiffness in estimating the tire vertical deflection.

3. The tire load estimation system of claim 2, wherein the at least one tire static load sensor comprises at least one tire-mounted sensor for measuring a rolling tire footprint length.

4. The tire load estimation system of claim 1, wherein the at least one vehicle chassis-mounted sensor for measuring a vehicle chassis vertical deflection comprises a chassis acceleration measuring sensor for measuring a chassis vertical acceleration; and a hub acceleration measuring sensor for measuring a vertical acceleration of the wheel hub of the at least one tire.

5. The tire load estimation system of claim 4, wherein the tire deflection estimator comprises a linear filter model receiving as inputs the chassis vertical acceleration and the wheel hub vertical acceleration.

6. The tire load estimation system of claim 5, wherein the linear filter model comprises a Kalman filter model.

7. The tire load estimation system of claim 5, wherein further comprising:
a tire inflation pressure measuring sensor mounted to the at least one tire for measuring a tire inflation pressure within a tire cavity of the at least one tire;
a tire-specific stiffness database for identifying a tire-specific stiffness for the at least one tire at the measured tire inflation pressure; and
a tire vertical stiffness estimator for estimating a tire vertical stiffness from the measured tire air pressure and the tire-specific stiffness for the at least one tire; and wherein the linear filter model operably uses as an input the tire vertical stiffness in estimating the tire vertical deflection estimate.

8. A tire load estimation system for a vehicle comprising:
at least one tire mounted to a wheel hub and supporting a vehicle chassis;
at least one load sensor mounted to the at least one tire for detecting a measured tire load on the at least one tire;
a tire static load estimator operable to determine a static tire load from the measured tire load;
at least one vehicle chassis-mounted sensor for measuring a vehicle chassis vertical deflection;
a tire deflection estimator operable to estimate a tire deflection by fusing the static load estimation of the at least one tire with the vehicle chassis vertical deflection;
a load variation estimator for estimating a substantially instantaneous load variation from the estimated tire deflection;
a tire load estimator for calculating a substantially instantaneous tire load estimation operably fusing the static tire load with the instantaneous load variation.

9. The tire load estimation system of claim 8, wherein the at least one static load sensor comprises at least one tire-attached sensor for measuring a length of a rolling tire footprint.

10. The tire load estimation system of claim 8, wherein the at least one vehicle chassis-mounted sensor for measuring the vehicle chassis vertical deflection comprises a chassis vertical acceleration measuring sensor for measuring a chassis vertical acceleration; and a hub acceleration measuring sensor for measuring a vertical acceleration of the wheel hub of the at least one tire.

11. The tire load estimation system of claim 10, wherein the tire deflection estimator comprises a linear filter model receiving as inputs the vehicle chassis vertical acceleration and the wheel hub vertical acceleration.

12. The tire load estimation system of claim 11, wherein the linear filter model comprises a Kalman filter model.

13. A method of estimating a tire load for a vehicle comprising:
supporting a vehicle chassis by at least one tire mounted to a wheel hub;
detecting a measured static tire load by a tire static load sensor mounted to the at least one tire;
calculating an estimated tire static load based on the measured static tire load;
detecting a measured vehicle chassis vertical deflection from a sensor mounted to the vehicle chassis;
estimating a tire vertical deflection from the vehicle chassis vertical deflection and the static tire load;
calculating an estimated load variation from the tire vertical deflection estimation; and
estimating a substantially instantaneous tire load on the at least one tire based on the estimated tire static load and the estimated load variation.

14. The method of claim 13, wherein further comprising:
measuring a tire inflation pressure within a tire cavity;
identifying from a tire-specific stiffness database a tire-specific stiffness for the at least one tire using the measured tire inflation pressure.

15. The method of claim 14, wherein further comprising measuring a rolling tire footprint length to determine the measured static tire load.

16. The method of claim 14, wherein further comprising:
measuring a vertical acceleration of the vehicle chassis; and
measuring a vertical acceleration of the wheel hub to which the at least one tire;
estimating the tire vertical deflection from the static load estimation, vertical acceleration of the vehicle chassis, and vertical acceleration of the wheel hub.

17. The method of claim 16, wherein further comprising using a linear filter model to estimate the tire vertical deflection.

* * * * *